US012561584B2

(12) United States Patent
Asahara et al.

(10) Patent No.: US 12,561,584 B2
(45) Date of Patent: Feb. 24, 2026

(54) TEACHING DATA PREPARATION DEVICE, TEACHING DATA PREPARATION METHOD, AND PROGRAM

(71) Applicant: Toyota Jidosha Kabushiki Kaisha, Toyota (JP)

(72) Inventors: Norimi Asahara, Numadu (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 918 days.

(21) Appl. No.: 17/384,253

(22) Filed: Jul. 23, 2021

(65) Prior Publication Data

US 2022/0027763 A1 Jan. 27, 2022

(30) Foreign Application Priority Data

Jul. 27, 2020 (JP) .................................. 2020-126834

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC . G06N 5/04; G06N 20/00; G06N 3/08; G06F 18/214
See application file for complete search history.

(56) References Cited

U.S. PATENT DOCUMENTS

2011/0246043 A1* 10/2011 Maruyama ............ B60W 30/17
2016/0146091 A1* 5/2016 Kim ........................ F01P 7/048

2019/0137969 A1* 5/2019 Watanabe .......... G05B 19/4063
2019/0138423 A1* 5/2019 Agerstam ............... H04L 67/12
2019/0347494 A1* 11/2019 Gerardo Castro ... G05D 1/0231
2020/0041159 A1* 2/2020 Kim ......................... F24F 11/38
2020/0252461 A1* 8/2020 Xu .......................... G06N 5/027
2021/0056410 A1* 2/2021 Jha ......................... G06Q 10/04
2021/0182385 A1* 6/2021 Roychowdhury .... G06F 21/552
2021/0316720 A1* 10/2021 Dewey .................. G06Q 40/08
2022/0388530 A1* 12/2022 Patne ................. B60W 60/001

FOREIGN PATENT DOCUMENTS

JP       2008-304970 A    12/2008
JP       2017-207904 A    11/2017
JP       2018-000229 A     1/2018
JP       2020-045821 A     3/2020

OTHER PUBLICATIONS

Van, et al. "Real-time sensor anomaly detection and identification in automated vehicles." (Year: 2019).*

* cited by examiner

*Primary Examiner* — Michelle T Bechtold
*Assistant Examiner* — Matiyas T Maru
(74) *Attorney, Agent, or Firm* — Dinsmore & Shohl LLP

(57) ABSTRACT

A teaching data preparation device includes: an acquisition unit configured to acquire a plurality of sensor values from a plurality of sensors; a calculation unit configured to use a sensor value included in the sensor values to calculate a calculation value corresponding to a sensor value other than the used sensor value; a determination unit configured to determine whether each of the sensors is normal; and a teaching data preparation unit configured to prepare, when the determination unit determines that at least one of the sensors is not normal, teaching data from an input-output dataset including at least one calculation value that corresponds to the sensor value of the sensor determined to be not normal.

5 Claims, 9 Drawing Sheets

■SENSOR NORMAL STATE

DATASET $(X_1, \cdots, X_n : Y_1, \cdots, Y_m)$  ⟶ TEACHER DATA

SENSOR VALUE    SENSOR VALUE

■SENSOR ABNORMAL STATE

DATASET $(X_1, \cdots, X_n : y_1, \cdots, y_m)$  ⟶ TEACHER DATA

SENSOR VALUE    CALCULATION VALUE

VEHICLE STATE AND ENVIRONMENT INFORMATION
(VEHICLE SPEED, OUTSIDE AIR TEMPERATURE,
OUTSIDE AIR PRESSURE, ETC.)

TEACHING DATA PREPARATION DEVICE, TEACHING DATA PREPARATION METHOD, AND PROGRAM

CROSS-REFERENCE TO RELATED APPLICATION

This application claims priority to Japanese Patent Application No. 2020-126834 filed on Jul. 27, 2020, incorporated herein by reference in its entirety.

BACKGROUND

1. Technical Field

The present disclosure relates to a teaching data preparation device, a teaching data preparation method, and a program.

2. Description of Related Art

Disclosed in Japanese Unexamined Patent Application Publication No. 2018-229 is a teaching data preparation device. The teaching data preparation device includes two or more sensors mounted on places where acceleration different in quality or quantity is generated depending on a posture or a motion state of a user. Based on acceleration information acquired from the sensors, the teaching data preparation device identifies the posture and the motion state of the user, and associates the identified posture and motion state with the acceleration information acquired from at least one of the two or more sensors to prepare teaching data.

SUMMARY

The disclosed teaching data preparation device may fail to prepare teaching data when there is a sensor that is not normal, which is to say that there is a sensor that is out of order or has a deteriorated sensing accuracy.

The present disclosure has been made in view of the above circumstances, and it is an object of the present disclosure to provide a teaching data preparation device, a teaching data preparation method, and a program, capable of preparing teaching data even when there is a sensor that is not normal.

One aspect of the present disclosure relates to a teaching data preparation device. The teaching data preparation device includes: an acquisition unit; a calculation unit; a determination unit; and a teaching data preparation unit. The acquisition unit is configured to acquire a plurality of sensor values from a plurality of sensors. The calculation unit is configured to use a sensor value included in the sensor values to calculate a calculation value corresponding to a sensor value other than the used sensor value. The determination unit is configured to determine whether each of the sensors is normal. The teaching data preparation unit is configured to prepare, when the determination unit determines that at least one of the sensors is not normal, teaching data from an input-output dataset including the calculation value that corresponds to the sensor value of the sensor determined to be not normal.

Thus, the teaching data is prepared from an input-output dataset including the calculation value corresponding to the sensor value of the sensor determined to be not normal. Hence, teaching data can be prepared even when there is a sensor which is not normal.

The determination unit may be configured to determine that the sensor is not normal, when the sensor is out of order or has sensing accuracy deteriorated by a prescribed degree or more.

Thus, it is possible to cope with both a sensor abnormality when the sensor is out of order and a sensor abnormality when the accuracy of the sensor is deteriorated.

The determination unit may be configured to compare the sensor value with the calculation value to determine the sensing accuracy of the sensor.

Thus, since the sensing accuracy of the sensor can be determined by comparing the sensor value with the calculation value, deterioration of sensor accuracy can more suitably be determined.

The teaching data preparation device may further include a storage unit configured to store the result of determination by the determination unit. The teaching data preparation unit may use a calculation value corresponding to the sensor value of the sensor determined in the past to be normal and stored in the storage unit as the calculation value to be included in the input-output dataset.

Thus, high quality teaching data can be prepared using the calculation value that is considered to be less deviated from the sensor value that is obtainable if the sensor, determined to be normal in the past, is normal.

The teaching data preparation unit may include in the input-output dataset the sensor value of the sensor determined to be normal by the determination unit.

Accordingly, quality teaching data can be prepared by taking advantage of the sensor value which is precious raw data.

One aspect of the present disclosure is a teaching data preparation method including: acquiring a plurality of sensor values from a plurality of sensors; using a sensor value included in the sensor values to calculate a calculation value corresponding to a sensor value other than the used sensor value; storing the calculation value in a storage unit, determining whether each of the sensors is normal; and preparing, when at least one of the sensors is determined to be not normal, teaching data from an input-output dataset including the calculation value that corresponds to the sensor value of the sensor determined to be not normal, the calculation value being read from the storage unit.

Thus, the teaching data is prepared from the input-output dataset including the calculation value corresponding to the sensor value determined to be not normal. Hence, it is possible to prepare the teaching data even when there is a sensor that is not normal.

One aspect of the present disclosure is a program causing a processor having hardware to execute: acquiring a plurality of sensor values from a plurality of sensors; using a sensor value included in the sensor values to calculate a calculation value corresponding to a sensor value other than the used sensor value; storing the calculation value in a storage unit, determining whether each of the sensors is normal; and preparing, when at least one of the sensors is determined to be not normal, teaching data from an input-output dataset including the calculation value that corresponds to the sensor value of the sensor determined to be not normal, the calculation value being read from the storage unit.

Thus, the teaching data is prepared from an input-output dataset including the calculation value corresponding to the sensor value determined to be not normal. Hence, it is possible to prepare the teaching data even when there is a sensor that is not normal.

The present disclosure can prepare teaching data even when there is a sensor that is not normal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
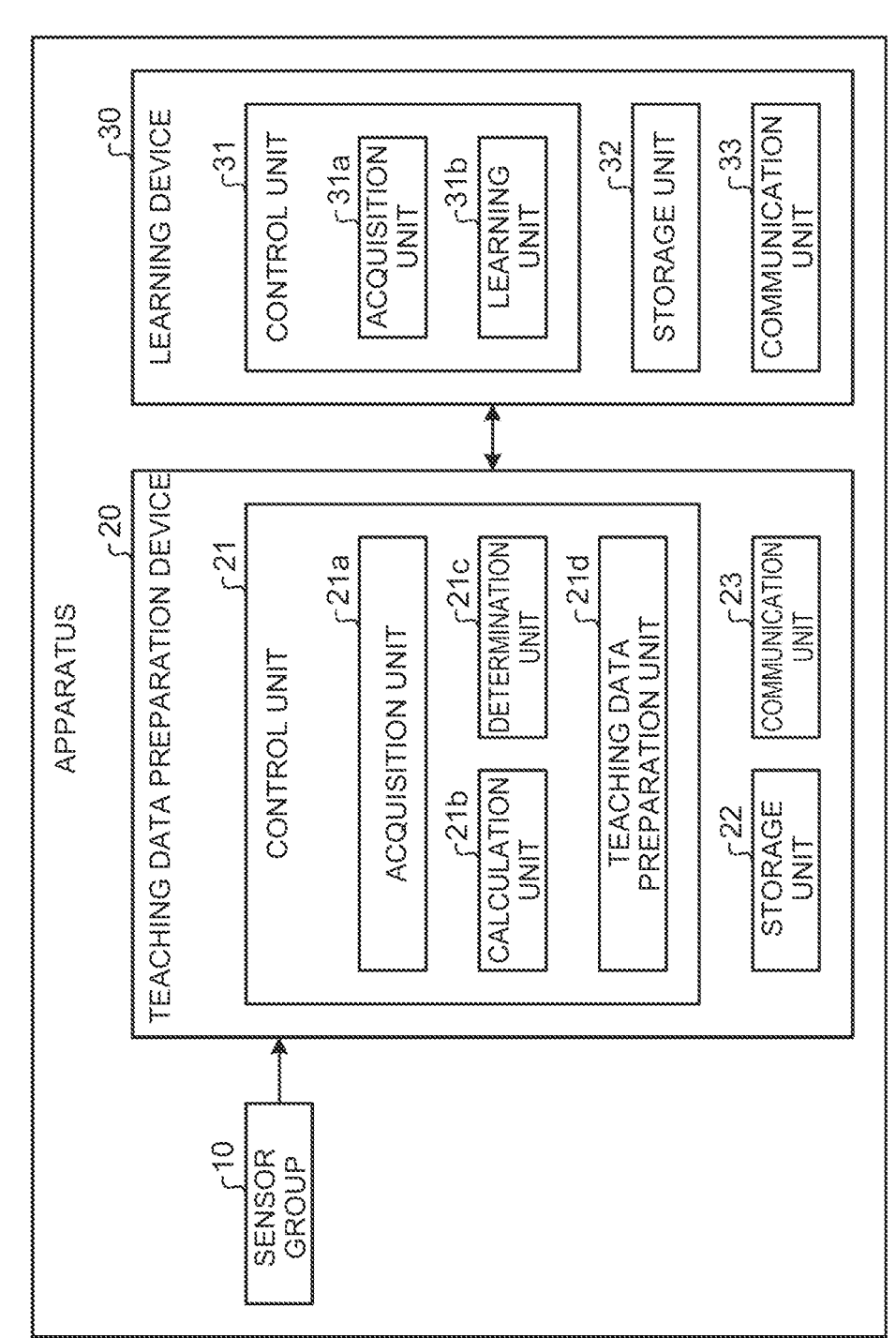
FIG. 1 is a schematic view showing the configuration of an apparatus including a teaching data preparation device according to an embodiment.

Hereinafter, an embodiment of the present disclosure will be described in details with reference to the drawings. In the drawings, identical or corresponding component members are appropriately denoted by identical numerals, and redundant description is omitted.

System Configuration

FIG. 1 is a schematic view showing the configuration of an apparatus including a teaching data preparation device according to the embodiment. An apparatus 100 includes a sensor group 10, a teaching data preparation device 20, and a machine learning device 30. The sensor group 10, the teaching data preparation device 20, and the machine learning device 30 are communicably connected with each other through a communication network, such as a controller area network (CAN). The apparatus 100 is not particularly limited. Examples of the apparatus 100 include a robot apparatus, a transportation apparatus, and a wearable apparatus disclosed in Japanese Unexamined Patent Application Publication No. 2018-229.

Sensor Group

The sensor group 10 is made up of a plurality of sensors that detect the state and characteristics of the apparatus 100. Each sensor in the sensor group 10 transmits a sensor value that is a detection result to the teaching data preparation device 20 through a network, such as CAN.

Teaching data Preparation Device

The teaching data preparation device 20 includes a control unit 21, a storage unit 22, and a communication unit 23.

For example, the control unit 21 includes a processor, such as a central processing unit (CPU), a digital signal processor (DSP), and a field-programmable gate array (FPGA), and a primary storage, such as a random access memory (RAM), and a read only memory (ROM). The control unit 21 reads programs stored in the storage unit 22 to a work area of the primary storage and executes the programs therein. Through execution of the programs by the processor, the control unit controls each component unit, or the like. As a result, hardware and software collaborate to implement functional modules corresponding to prescribed purposes.

The control unit 21 includes, as the functional modules, an acquisition unit 21a, a calculation unit 21b, a determination unit 21c, and a teaching data preparation unit 21d. The acquisition unit 21a acquires a plurality of sensor values from the sensor group 10. The calculation unit 21b uses a sensor value included in the acquired sensor values to calculate a calculation value corresponding to a sensor value other than the used sensor values, and stores the calculation value in the storage unit 22. The determination unit 21c determines whether each of the sensors in the sensor group 10 is normal. The determination unit 21c also compares the sensor value with the calculation value to determine the sensing accuracy of the sensor. The teaching data preparation unit 21d prepares teaching data from an input-output dataset including a sensor value or a calculation value. The control unit 21 stores the prepared teaching data in the storage unit 22. The control unit 21 reads the teaching data stored in the storage unit 22, and makes the communication unit 23 transmit the teaching data.

The storage unit 22 is constituted of a storage medium, such as a RAM, a hard disk drive (HDD), or a removable medium. The storage unit 22 is also called an auxiliary storage. For example, the removable medium is a universal serial bus (USB) memory, or a disc recording medium such as a compact disc (CD), a digital versatile disc (DVD), and a Blue-ray (registered trademark) disc (BD). The storage unit 22 may be constituted of a computer-readable recording medium, such as a memory card that is externally mountable. An operating system (OS), various programs, various tables, various databases, and the like, for implementing the functions of the teaching data preparation device 20 are stored in the storage unit 22 in advance, or are downloaded and stored in the storage unit 22 through the communication network.

The communication unit 23 is configured to include, for example, a communication interface, such as a CAN interface board, to communicate with the sensor group 10 and the machine learning device 30. The communication unit 23 receives sensor value data from the sensor group 10, and transmits teaching data to the machine learning device 30.

Machine Learning Device

The machine learning device 30 includes a control unit 31, a storage unit 32, and a communication unit 33.

The control unit 31 includes a processor and a primary storage as in the case of the control unit 21 of the teaching data preparation device 20. The control unit 31 reads programs stored in the storage unit 32 to a work area of the primary storage and executes the programs therein. Through execution of the programs, the control unit 31 controls each component unit, or the like, to implement functional modules corresponding to prescribed purposes.

The control unit 31 includes an acquisition unit 31a and a learning unit 31b as a functional module. The acquisition unit 31a reads and acquires from the storage unit 32 the teaching data transmitted from the teaching data preparation device 20. The learning unit 31b performs machine learning using the teaching data, and generates a learned model.

The storage unit 32 is constituted of a storage medium same as in the storage unit 22 of the teaching data preparation device 20. The storage unit 32 may store an OS, various programs, various tables, various databases, and the like, for implementing the functions of the machine learning device 30. The storage unit 32 also stores the teaching data transmitted from the teaching data preparation device 20, and a learned model generated by the learning unit 31b.

The learned model is a model prepared by performing machine learning by deep learning using a feedforward neural network, for example. In this case, "the storage unit 32 stores the learned model" means that the storage unit 32 stores information, such as network parameters, and calculation algorithms, in the learned model. Similarly, the "transmitting, receiving, or reading the learned model" as stated below also means transmitting, receiving, or reading information, such as network parameters, and calculation algorithms.

Like the communication unit 23 of the teaching data preparation device 20, the communication unit 33 is configured to include a communication interface to communicate with the teaching data preparation device 20. For example, the communication unit 33 receives the teaching data transmitted from the teaching data preparation device 20.

Functions of Teaching data Preparation Device

Next, the functions of the teaching data preparation device 20 will be described more in detail. In the control unit 21 of the teaching data preparation device 20, the calculation unit 21b uses a sensor value, included in a plurality of sensor values, as an input sensor value to calculate a calculation value corresponding to a sensor value other than the input sensor value. For example, the calculation unit 21b reads a program to execute a calculation model stored in the storage unit 22, and performs calculation using at least one input sensor value as an input value and using at least one calculation value as an output value. The calculation model is optimized such that a calculation value falls within a prescribed error range with respect to a corresponding sensor value. Such a calculation model may be a learned model obtained by machine learning or the like, or may be a physical model constructed using a calculation expression expressing a physical law (an equation of motion, or the like).

The determination unit 21c determines whether each sensor in the sensor group 10 is normal. For example, the determination unit 21c reads data stored in the storage unit 22, the data indicating the range of numerical values that the sensor values of each sensor can take. When an obtained sensor value is out of the range of numerical values, the determination unit 21c determines that the pertinent sensor is out of order. The determination unit 21c also compares the sensor value of the sensor that is determined to be normal with a corresponding calculation value to determine the sensing accuracy of the sensor. When, for example, a difference between the sensor value and the calculation value is equal to or more than a prescribed value, the determination unit 21c determines that the sensing accuracy of the sensor is deteriorated by a prescribed degree or more. The prescribed value is a value used as an index to determine the sensing accuracy of the sensor, and is stored in the storage unit 22, for example. The determination unit 21c finally determines that the sensor that is out of order or that has the sensing accuracy deteriorated by the prescribed degree or more is not normal.

The teaching data preparation unit 21d prepares, when the determination unit 21c determines that at least one of the sensors is not normal, teaching data from input-output dataset including a calculation value corresponding to the sensor value of the sensor determined to be not normal.

Figure 2:
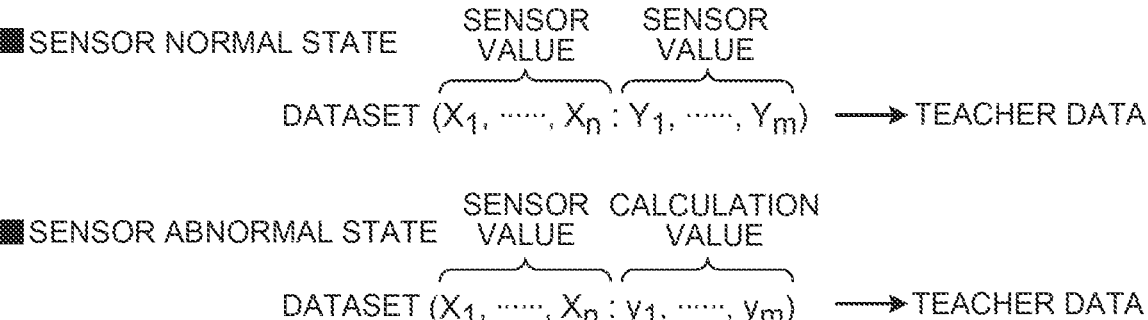
FIG. 2 is an explanatory view of the outline of teaching data preparation.

FIG. 2 is an explanatory view showing the outline of teaching data in the teaching data preparation unit 21d. First, in a sensor normal state where all the sensors are determined to be normal, the teaching data preparation unit 21d prepares an input-output dataset $(X_1, \ldots, X_n: Y_1, \ldots, Y_m)$ from the sensor values. Variables n and m are integers of one or larger, and the number of data pieces is (n+m). In an example showing the sensor normal state in FIG. 2, the data included in the input-output dataset are sensor values that are raw data. Data $X_1, \ldots, X_n$ constitute an input dataset. Data $Y_1, \ldots, Y_m$ constitute an output dataset. The teaching data preparation unit 21d applies publicly-known pre-processing, such as deletion or supplementation of deficit data, and normalization or standardization of data, to the input-output dataset, and prepares teaching data.

Next, in a sensor abnormal state where at least one of the sensors is determined to be not normal, the teaching data preparation unit 21d prepares an input-output dataset $(X_1, \ldots, X_n: y_1, \ldots y_m)$ from sensor values and calculation values. In the example shown in FIG. 2, data $y_1, \ldots, y_m$ are calculation values. The values $y_1, \ldots, y_m$ constitute an output dataset. The values $y_1, \ldots, y_m$ are calculation values corresponding to the sensor values $Y_1, \ldots, Y_m$, respectively. In the example showing the sensor abnormal state in FIG. 2, when it is determined that at least one of the sensors that detect the sensor values constituting an output dataset is not normal, all the sensor values that constitute the output dataset are replaced with the calculation values. The teaching data preparation unit 21d applies publicly-known pre-processing, such as deletion or supplementation of deficit data, and normalization or standardization of data, to the input-output dataset, and prepares teaching data.

In the teaching data preparation device 20 configured as described above, the acquisition unit 21a acquires a plurality of sensor values from a plurality of sensors of the sensor group 10. The calculation unit 21b uses a sensor value included in the sensor values to calculate a calculation value corresponding to the sensor value other than the used sensor value, and stores the calculation value in the storage unit 22. The determination unit 21c determines whether each of the sensors is normal. When the determination unit 21c determines that at least one of the sensors is not normal, the teaching data preparation unit 21d reads a calculation value corresponding to the sensor value of the sensor determined to be not normal from the storage unit 22, and prepares teaching data from an input-output dataset including the read calculation value.

Accordingly, the teaching data preparation device 20 can prepare teaching data from an input-output dataset including the calculation value corresponding to the sensor value, even when there is a sensor which is not normal.

When a sensor is out of order or has the sensing accuracy deteriorated by a prescribed degree or more, the determination unit 21c determines that the sensor is not normal. Hence, it is possible to cope with both a sensor abnormality when the sensor is out of order and a sensor abnormality when the accuracy of the sensor is deteriorated.

Since the determination unit 21c compares a sensor value and a calculation value of a sensor, and determines the sensing accuracy of the sensor, it is possible to determine the sensing accuracy of the sensor based on the calculation value.

In the example showing the sensor abnormal state in FIG. 2, when it is determined that at least one of the sensors that detect the sensor values constituting an output dataset is not normal, all the sensor values that constitute the output dataset are replaced with the calculation values. However, the replacement of the sensor values with the calculation values is not limited to this.

For example, the teaching data preparation unit 21*d* may include in the input-output dataset the sensor value of a sensor determined to be normal by the determination unit 21*c*. Thus, it is possible to prepare quality teaching data by taking advantage of the sensor value that is precious raw data, and thereby the accuracy of learning in the machine learning device 30 can be enhanced at an early stage.

The storage unit 22 may also store the result of determination by the determination unit 21*c*, and the teaching data preparation unit 21*d* may use the calculation value corresponding to the sensor value of a sensor that is determined in the past to be normal and stored in the storage unit 22 as a calculation value to be included in the input-output dataset. Thus, high quality teaching data can be prepared by using the calculation value that is considered to be less deviated from a sensor value that is obtainable if the sensor, determined to be normal in the past, is normal.

The replacement of the sensor values with the calculation values is not limitedly applied to the data that is going to constitute the output dataset. The replacement may also be applied to the data that is going to constitute the input dataset. As a result, when there is a sensor that is not normal, teaching data can be still prepared, regardless of whether the sensor value to be acquired from the sensor that is not normal becomes input data or output data.

Processing Flow

Various processes executed in the teaching data preparation device 20 or the machine learning device 30 will be described. In the following flowchart, the sensors of the sensor group 10, and the sensor values, calculation values and flags corresponding to the sensors are provided with a subscript "i" to indicate that they are associated with a count i.

Figure 3:
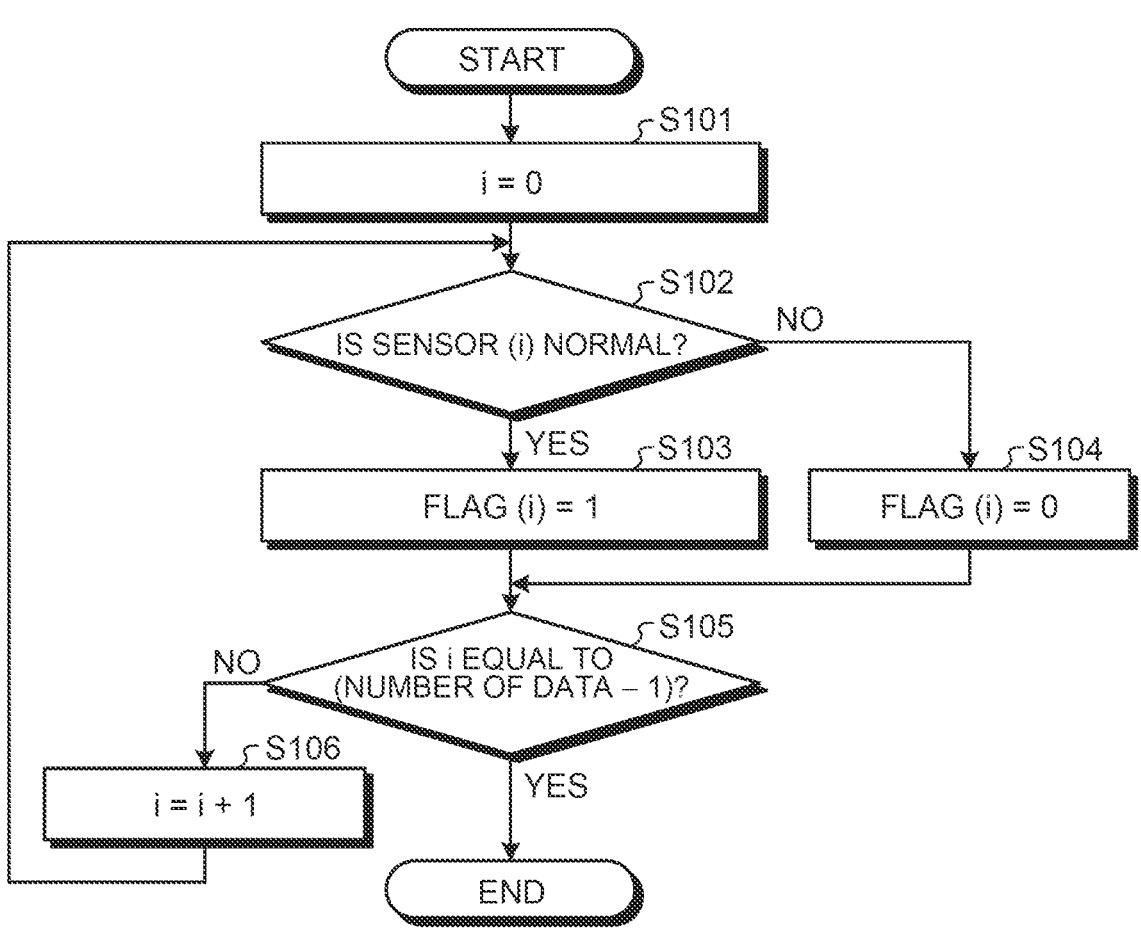
FIG. 3 is a flowchart showing a process of determining whether sensors are normal.

FIG. 3 is a flowchart showing a process of determining whether sensors are normal. First, in step S101, the determination unit 21*c* initializes the count i to i=0. Next, in step S102, the determination unit 21*c* determines whether a sensor (i) is normal. When determining that the sensor (i) is normal (Yes in step S102), the determination unit 21*c* sets a flag (i) to 1 in step S103. When determining that the sensor (i) is not normal and out of order (No in step S102), the determination unit 21*c* sets the flag (i) to 0 in step S104.

Next, in step S105, the determination unit 21*c* determines whether the count i is equal to (the number of data—1). When the count i is (the number of data—1) (Yes in step S105), the determination unit 21*c* ends the process. When the count i is not equal to (the number of data—1) (No in step S105), the determination unit 21*c* increments the count i in step S106, and returns to step S102. In this way, whether all the sensors are normal or out of order is determined.

Figure 4:
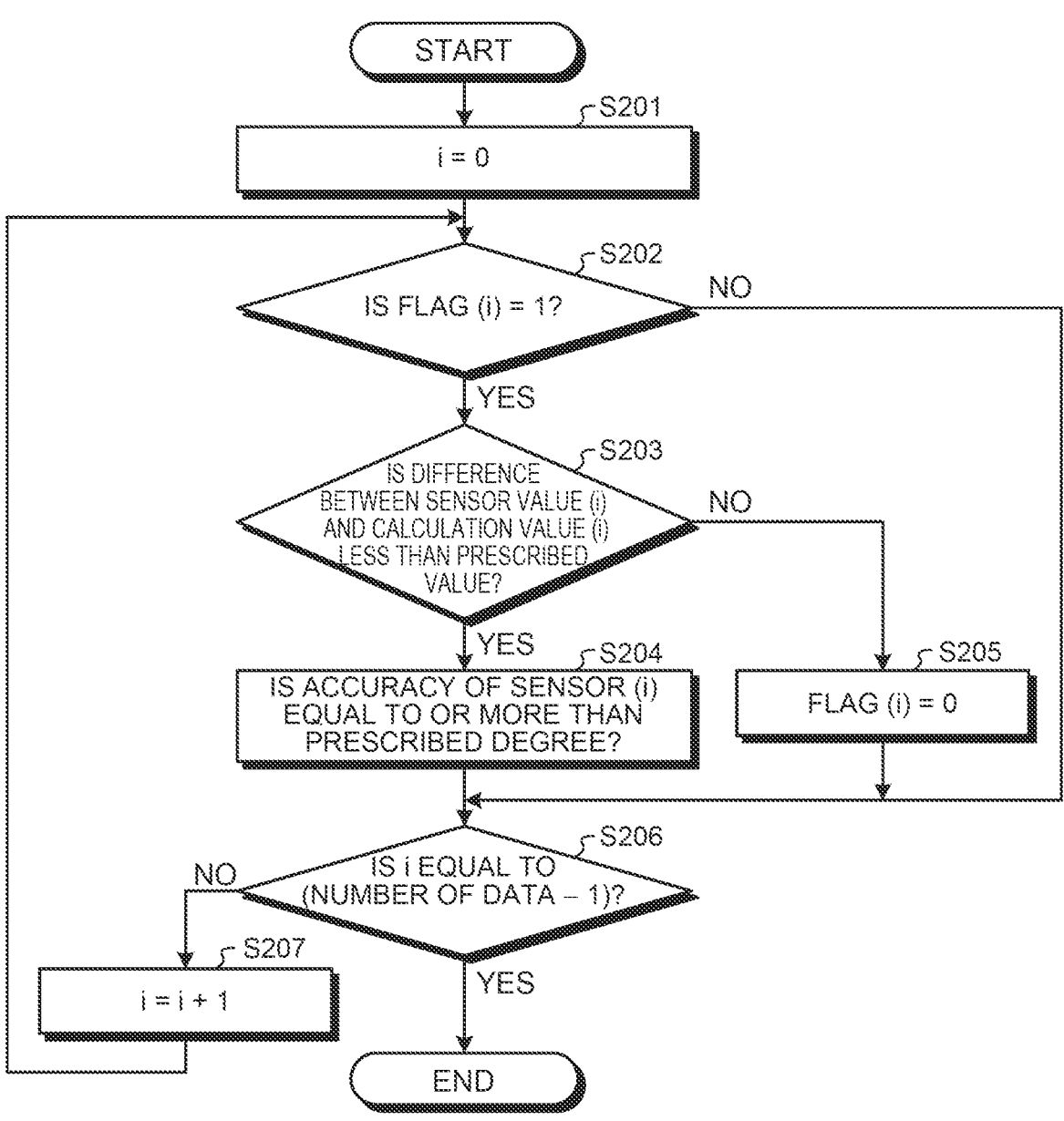
FIG. 4 is a flowchart showing a process of determining the accuracy of the sensors.

FIG. 4 is a flowchart showing a process of determining the accuracy of the sensors. First, in step S201, the determination unit 21*c* initializes the count i to i=0. Next, in step S202, the determination unit 21*c* checks whether flag (i) is 1. When the flag (i) is 1 (Yes instep S202), the process proceeds step S203. When the flag (i) is 0 (No in step S202), the process proceeds to step S206.

In step S203, the determination unit 21*c* determines whether a difference between a sensor value (i) and a calculation value (i) is less than a prescribed value. The prescribed value is stored in advance in the storage unit 22, for example, and is set in accordance with the accuracy allowed for the sensor. When the calculation value (i) is less than the prescribed value (Yes in step S203), the determination unit 21*c* determines that the accuracy of the sensor (i) is equal to or more than a prescribed degree (S204). When the accuracy of the sensor (i) is equal to or more than the prescribed degree (No in step S203), the determination unit 21*c* changes the flag (i) to 0 in step S205. Then, the process proceeds to step S206.

Next, in step S206, the determination unit 21*c* determines whether the count i is equal to (the number of data—1). When the count i is equal to (the number of data—1) (Yes in step S206), the determination unit 21*c* ends the process. When the count i is not equal to (the number of data—1) (No in step S206), the determination unit 21*c* increments the count i in step S207, and returns to step S202. Thus, whether all the sensors are normal, out of order, or have the sensing accuracy deteriorated by the prescribed degree or more is determined.

Figure 5:
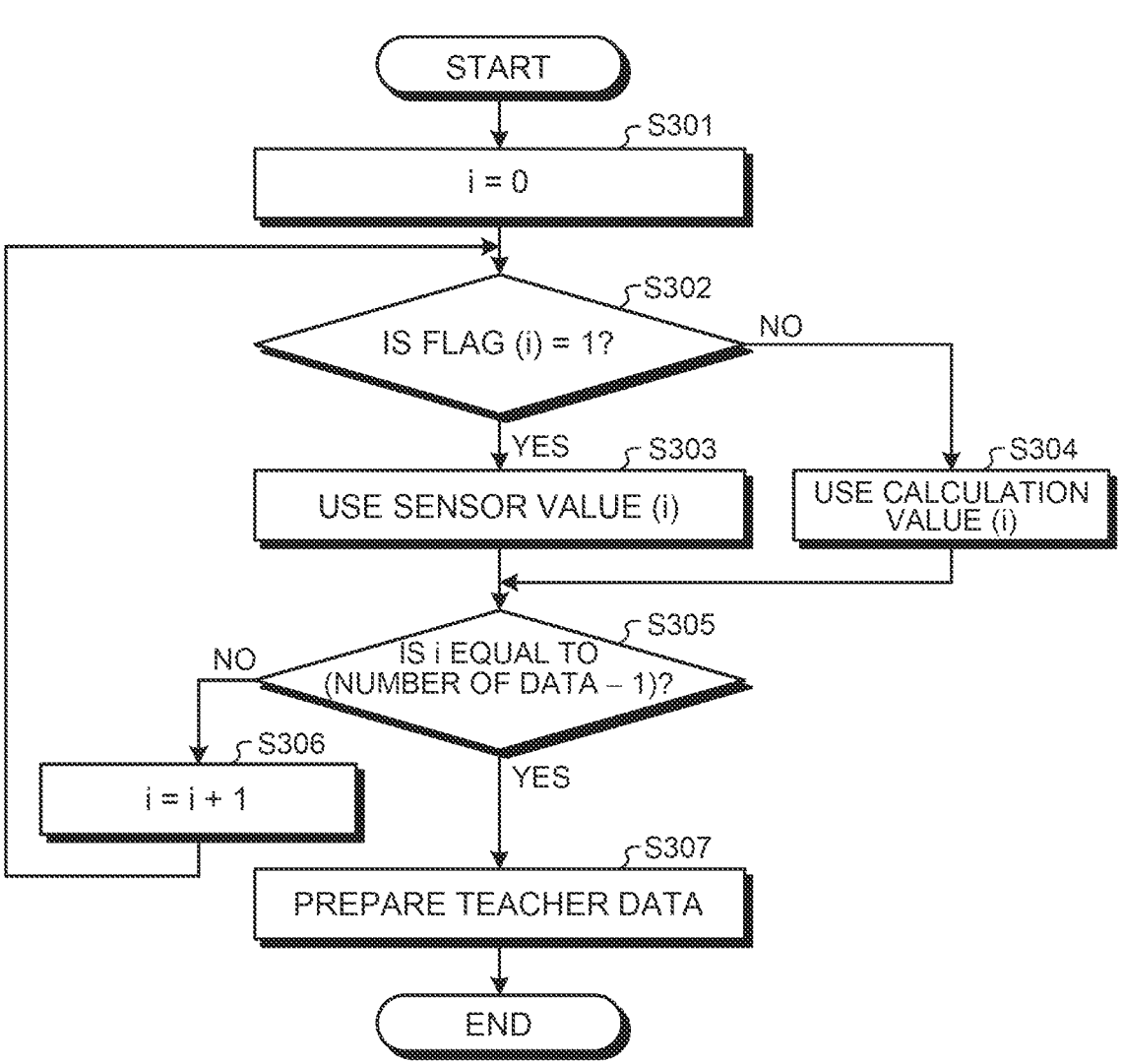
FIG. 5 is a flowchart showing a process of preparing teaching data.

FIG. 5 is a flowchart showing a process of preparing teaching data. First, in step S301, the teaching data preparation unit 21*d* initializes the count i to i=0. Next, in step S302, the teaching data preparation unit 21*d* checks whether the flag (i) is 1. When the flag (i) is 1 (Yes in step S302), the teaching data preparation unit 21*d* determines to use the sensor value (i) in step S303. When the flag (i) is 0 (No in step S302), the teaching data preparation unit 21*d* determines to use the calculation value (i) in step S304.

Next, in step S305, the teaching data preparation unit 21*d* determines whether the count i is equal to (the number of data—1). When the count i is equal to (the number of data—1) (Yes in step S305), the process proceeds to step S307. When the count i is not equal to (the number of data—1) (No in step S305), the teaching data preparation unit 21*d* increments the count i in step S306, and returns to step S302.

In step S307, the teaching data preparation unit 21*d* prepares teaching data using the sensor value (i) or the calculation value (i) determined to be used, stores the prepared teaching data in the storage unit 22, and ends the process.

Then, the control unit 21 reads the teaching data stored in the storage unit 22, and makes the communication unit 23 transmit the teaching data. The transmission process may sequentially be performed when the teaching data is stored, or may collectively be performed once a certain amount of teaching data is stored in the storage unit 22.

Figure 6:
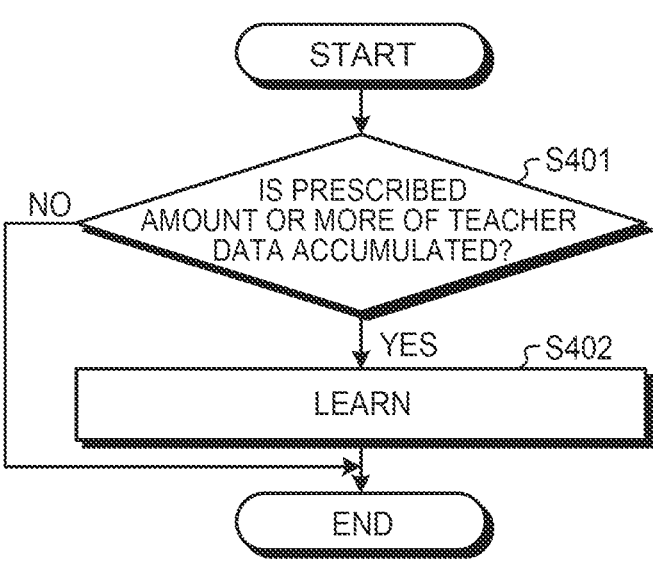
FIG. 6 is a flowchart showing a process of executing machine learning.

FIG. 6 is a flowchart showing a process of executing machine learning. First, the learning unit 31*b* determines whether a prescribed amount or more of teaching data is accumulated in the storage unit 32. The prescribed amount is a value stored in the storage unit 32 in advance. The value is used as an index which defines the quality of machine learning to be an allowable degree. When the prescribed amount or more of teaching data are accumulated (Yes in step S401), the learning unit 31*b* performs machine learning in step S402, and ends the process. When the prescribed amount or more of teaching data are not accumulated (No in step S401), the learning unit 31*b* ends the process.

Examples of Sensor, Sensor Value, and Calculation Value

Description is now given of an example of a method of using a sensor value to calculate a calculation value corresponding to a sensor value other than the used sensor value. Described below is a case where the apparatus is a vehicle having an engine as a power source and configured to perform cruise control, and the sensors detect the state and characteristics of the apparatus.

Figure 7:
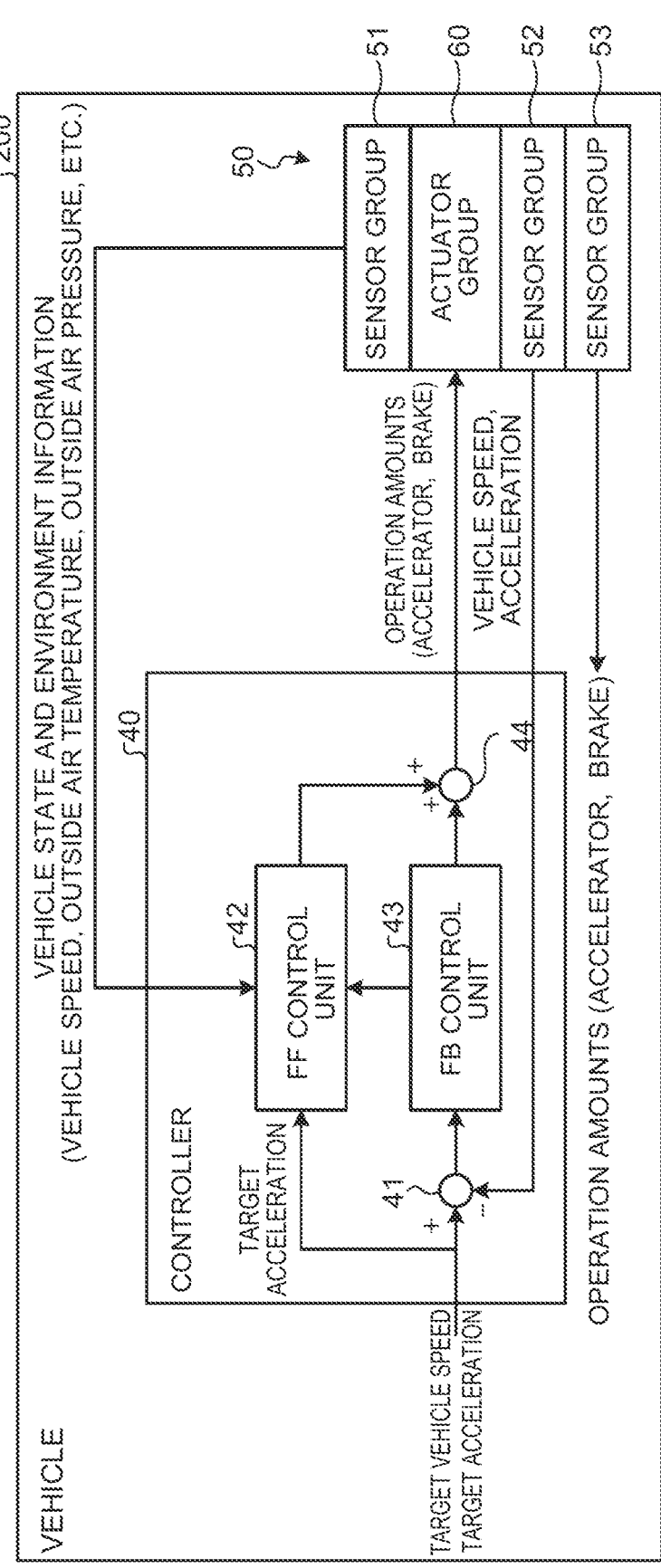
FIG. 7 is a block diagram illustrating control of cruise control in a vehicle.

FIG. 7 is a block diagram illustrating control of cruise control in a vehicle; A vehicle 200 includes a controller 40, a sensor group 50, and an actuator group 60.

Figure 8:
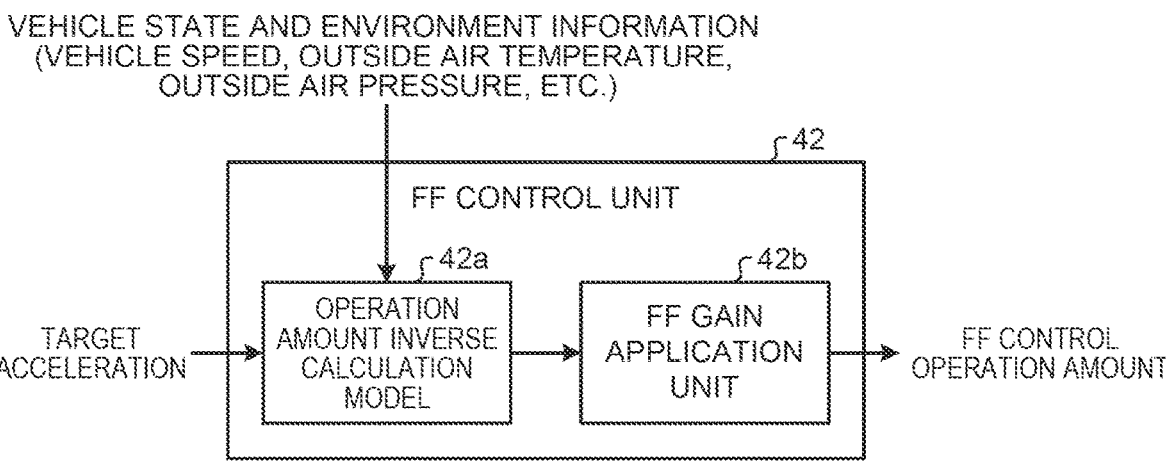
FIG. 8 is a block diagram of an FF control unit.

For example, the controller 40 is an electronic control unit (ECU) having a microcomputer as a main component part. The microcomputer is constituted of a processor such as a CPU, a storage unit such as a ROM and a RAM, and the like, for example. The controller 40 includes a subtractor 41, an FF control unit 42, an FB control unit 43, and an adder 44 as a functional module implemented when the processor reads programs stored in the storage unit to a work area of the storage unit and executes the programs. As shown in a block diagram in FIG. 8, the FF control unit 42 includes an operation amount inverse calculation model 42a and an FF gain application unit 42b. The controller 40 controls cruise control as will be described later in detail.

The sensor group 50 includes sensor groups 51, 52, 53. The sensor group 51 includes a sensor that detects vehicle state and environment information regarding the vehicle 200. The vehicle state and environment information is information on vehicle speed, outside air temperature, outdoor air pressure, or the like. For example, the vehicle state and environment information may include engine speed. The sensor group 51 outputs a signal including the vehicle state and environment information to the FF control unit 42. The sensor group 52 includes a sensor that detects vehicle speed and acceleration. The sensor group 52 outputs a signal including information on vehicle speed and acceleration to the subtractor 41. The sensor group 53 includes a sensor that detects and outputs operation amounts of an accelerator and a brake.

The actuator group 60 includes an actuator that operates in response to an instruction signal regarding the operation amount from the controller 40. Specifically, the actuator group 60 includes a throttle actuator and a brake actuator. The throttle actuator controls a feed amount (throttle opening angle) of air fed to an engine in response to an instruction signal regarding the operation amount from the controller 40, and thereby controls driving force of the vehicle 200. The brake actuator controls a brake system in response to an instruction signal regarding the operation amount from the controller 40, and thereby controls braking force applied to the wheels of the vehicle 200.

Next, the control of cruise control will be described. The controller 40 receives input of a signal including information on target speed and target acceleration for cruise control. The subtractor 41 receives input of the target speed and target acceleration, as well as vehicle speed and acceleration detected by the sensor group 52. The subtractor 41 performs subtraction processing, and outputs a value of difference between the target speed and the detected vehicle speed, and a value of difference between the target acceleration and the detected acceleration to the FB control unit 43.

The FB control unit 43 performs feedback control based on the input values of difference, and outputs to the adder 44 the operation amounts of the accelerator and the brake, which are calculated to reduce the difference, as FB control operation amounts.

The FF control unit 42 receives input of a signal including the information on target acceleration, and a signal including the vehicle state and environment information. Based on these pieces of information and, for example, a stored map, the FF control unit 42 performs feedforward control, and outputs to the adder 44 the operation amounts of the accelerator and the brake as FF control operation amounts.

The adder 44 performs addition processing of the FB control operation amount and the FF control operation amount, and outputs the operation amounts of the accelerator and the brake to the actuator group 60. Thus, the control of cruise control is implemented.

Here, in the FF control unit 42, the operation amount inverse calculation model 42a receives input of a signal including the information on target acceleration and a signal including the vehicle state and environment information, and outputs an operation amount used as the basis of the FF control operation amount to the FF gain application unit 42b. The FF gain application unit 42b applies a prescribed gain to the input operation amount, and outputs the resultant operation amount as the FF control operation amount.

As the operation amount inverse calculation model 42a, a learned model by machine learning and a physical model can be used. The physical model is a model which executes following calculations, for example. Specifically, the operation amount inverse calculation model 42a using a physical model calculates necessary drive force from target acceleration, vehicle weight, and vehicle travel resistance that is a function of vehicle speed. Then, based on the necessary drive force, the operation amount inverse calculation model 42a calculates necessary engine torque using values, such as a tire radius, a differential ratio, and a TM gear. Based on the necessary engine torque and engine speed, the operation amount inverse calculation model 42a calculates a necessary accelerator operation amount using an engine torque characteristics map, and determines the operation amount to be applied to the throttle actuator.

Figure 9:
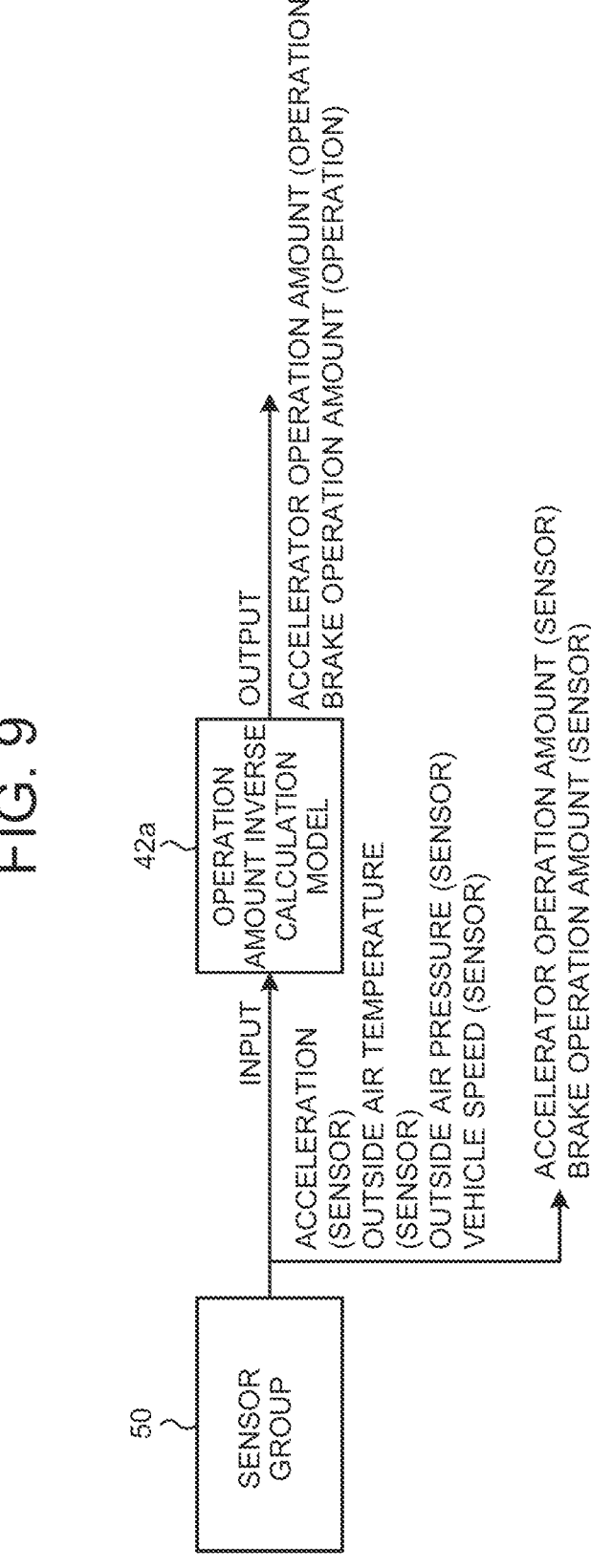
FIG. 9 is an explanatory view of sensor values and calculation values.

FIG. 9 is an explanatory view of sensor values and calculation values. The operation amount inverse calculation model 42a receives input of sensor values, such as an acceleration (sensor), an outside air temperature (sensor), an outdoor air pressure (sensor), and a vehicle speed (sensor) as input data from the sensor group 50, and outputs an accelerator operation amount (operation) and a brake operation amount (operation) which are calculation value. The sensor group 50 also outputs an accelerator operation amount (sensor) and a brake operation amount (sensor) which are sensor values.

The operation amount inverse calculation model 42a can be used as the calculation unit 21b in the teaching data preparation device 20. When the operation amount inverse calculation model 42a is a learned model, the teaching data preparation device 20 prepares, for example, a following dataset as the teaching data which is usable in the machine learning device 30. For example, as an example 1, when all the sensors are normal, teaching data {input dataset: output dataset} is {acceleration (sensor), outside air temperature (sensor), outdoor air pressure (sensor), vehicle speed (sensor): accelerator operation amount (sensor), brake operation amount (sensor)}.

As an example 2, when the sensor that detects the accelerator operation amount is abnormal, teaching data {input dataset: output dataset} is, for example, {acceleration (sensor), outside air temperature (sensor), outdoor air pressure (sensor), vehicle speed (sensor): accelerator operation amount (calculation), brake operation amount (sensor)}.

As an example 3, when the sensor that detects the brake operation amount is abnormal, teaching data {input dataset: output datasets} is, for example, {acceleration (sensor), outside air temperature (sensor), outdoor air pressure (sensor), vehicle speed (sensor): accelerator operation amount (sensor), brake operation amount (calculation)}.

In the case of a physical model, the operation amount inverse calculation model 42a can also be used as the calculation unit 21b in the teaching data preparation device 20. The operation amount inverse calculation model 42a calculates calculation values, such as an accelerator operation amount (calculation) and a brake operation amount (calculation). By appropriately using these calculation values, the teaching data preparation unit 21d can prepare the teaching data of the example 2 or 3 as the teaching data for preparing a learned model that the machine learning device 30 can use for the operation amount inverse calculation model 42*a*.

In the embodiment, difference between a sensor value and a calculation value is compared with a prescribed value to determine the sensing accuracy of the sensor. However, difference between an integrated value of sensor values and an integrated value of calculation values, a ratio of inclination, or difference of inclination, or the like, may be compared with a prescribed value to determine the sensing accuracy of a sensor.

In the embodiment, the teaching data preparation device 20 and the machine learning device 30 are mounted on the apparatus 100. However, the machine learning device 30 may be implemented in a server apparatus, or the teaching data preparation device 20 and the machine learning device 30 may be implemented in the server apparatus. In this case, data transmission and reception is performed between the apparatus 100 and the server apparatus by wireless communication through a communication network. The teaching data preparation device 20 may include a learning unit so as to function as a machine learning device. In this case, the machine learning device 30 may be omitted.

The embodiment is not intended to limit the present disclosure. The present disclosure includes those configured to include a combination of the component members described above as appropriate. Further effects and modifications can easily be derived by those skilled in the art. Therefore, more extensive aspects of the present disclosure are not limited by the embodiment, and various changes are possible.

What is claimed is:

1. An apparatus, comprising: a vehicle comprising a plurality of sensors and a first processor, the first processor receiving input of a signal including information on a target speed and a target acceleration from the plurality of sensors for executing cruise control;

and a machine learning device;

a teaching data preparation device, comprising a storage unit, and a second processor that is configured to:

acquire a plurality of sensor values from the plurality of sensors, the plurality of sensor values comprising vehicle state and environment information of the vehicle that includes an engine speed of the vehicle, a vehicle speed, an outside air temperature, and an outside air pressure;

use a sensor value included in the sensor values to calculate a calculation value corresponding to a sensor value other than the used sensor value;

determine at least one of the plurality of sensors is not normal; and prepare, when the second processor determines that the at least one of the plurality of sensors is not normal, teaching data from an input-output dataset including the calculation value that corresponds to the sensor value of the at least one of the plurality of sensors determined to be not normal;

wherein the storage unit is configured to store a result of determination by the second processor;

wherein the second processor uses a calculation value corresponding to the sensor value of the at least one of the plurality of sensors determined in past to be normal and stored in the storage unit as the calculation value to be included in the input-output dataset;

the second processor further configured to:

read the calculation value from the storage unit in response to determining that the at least one of the plurality of sensors is not normal; and transmit the teaching data including the read calculation value to the machine learning device;

the machine learning device is configured to generate, via machine learning, a learned model using the teaching data including the read calculation value received from the teaching data preparation device;

the first processor is configured to execute the cruise control in accordance with the signal and the learned model and based on the vehicle state and the environment information of the vehicle;

the second processor is configured to compare the sensor value with the calculation value to determine a sensing accuracy of the at least one of the plurality of sensors, the sensing accuracy of the at least one of the plurality of sensors being determined based on a difference between the sensor value and the calculation value, and a comparison with a prescribed value;

the machine learning device is configured to: determine that an amount or more of the teaching data is accumulated in the storage unit; and perform the machine learning in response to determining that the amount or more of the teaching data are accumulated, the amount is a value stored in advance in the storage unit, the value corresponding to an index that defines a quality of the machine learning;

the second processor is configured to: check that a flag is one; determine whether the difference between the sensor value and the calculation value is less than the prescribed value in response to determining that the flag is one; and change the flag to zero in response to determining that the sensing accuracy of the at least one of the plurality of sensors is equal to or more than a prescribed degree; and the first processor is configured to: calculate a drive force from the target acceleration, a vehicle weight, and a vehicle travel resistance that is a function of the vehicle speed; calculate an engine torque based on the drive force, a tire radius, a differential ratio, and a TM gear; and determine an operation amount to be applied to a throttle actuator based on the engine torque and the engine speed of the vehicle using an engine torque characteristics map.

2. The apparatus according to claim 1, wherein the second processor is configured to determine that the at least one of the plurality of sensors is not normal, when the at least one of the plurality of sensors is out of order or has sensing accuracy deteriorated by the prescribed degree or more.

3. The apparatus according to claim 1, wherein the second processor includes in the input-output dataset the sensor value of the at least one of the plurality of sensors determined to be normal by the second processor.

4. A method, comprising: receiving input of a signal including information on a target speed and a target acceleration from a plurality of sensors of a vehicle for executing cruise control;

acquiring a plurality of sensor values from the plurality of sensors, the plurality of sensor values comprising vehicle state and environment information of the vehicle that includes an engine speed of the vehicle, a vehicle speed, an outside air temperature, and an outside air pressure;

using a sensor value included in the sensor values to calculate a calculation value corresponding to a sensor value other than the used sensor value;

storing the calculation value in a storage unit;

determining at least one of the plurality of sensors is not normal;

preparing, when the at least one of the plurality of sensors is determined to be not normal, teaching data from an input-output dataset including the calculation value that corresponds to the sensor value of the at least one of the plurality of sensors determined to be not normal, the calculation value being read from the storage unit;

transmitting the teaching data including the read calculation value to a machine learning device;

generating, via machine learning by the machine learning device, a learned model using the teaching data including the read calculation value;

executing cruise control in accordance with the signal and the learned model and based on the vehicle state and the environment information of the vehicle;

comparing the sensor value with the calculation value to determine a sensing accuracy of the at least one of the plurality of sensors, the sensing accuracy of the at least one of the plurality of sensors senser being determined based on a difference between the sensor value and the calculation value, and a comparison with a prescribed value;

determining that an amount or more of the teaching data is accumulated in the storage unit, and performing the machine learning in response to determining that the amount or more of the teaching data are accumulated, the amount is a value stored in advance in the storage unit, the value corresponding to an index that defines a quality of the machine learning;

checking that a flag is one; determining whether the difference between the sensor value and the calculation value is less than the prescribed value in response to determining that the flag is one; and changing the flag to zero in response to determining that the sensing accuracy of the at least one of the plurality of sensors is equal to or more than a prescribed degree; and calculating a drive force from the target acceleration, a vehicle weight, and a vehicle travel resistance that is a function of the vehicle speed; calculating an engine torque based on the drive force, a tire radius, a differential ratio, and a TM gear; and determining an operation amount to be applied to a throttle actuator based on the engine torque and the engine speed of the vehicle using an engine torque characteristics map.

5. A non-transitory computer-readable medium on which a program is recorded, the program causing a processor to execute:

receiving input of a signal including information on a target speed and a target acceleration from a plurality of sensors for executing cruise control;

acquiring a plurality of sensor values from the plurality of sensors, the plurality of sensor values comprising vehicle state and environment information of the vehicle that includes an engine speed of the vehicle, a vehicle speed, an outside air temperature, and an outside air pressure;

using a sensor value included in the sensor values to calculate a calculation value corresponding to a sensor value other than the used sensor value;

storing the calculation value in a storage unit;

determining at least one of the plurality of sensors is not normal;

preparing, when the at least one of the plurality of sensors is determined to be not normal, teaching data from an input-output dataset including the calculation value that corresponds to the sensor value of the at least one of the plurality of sensors determined to be not normal, the calculation value being read from the storage unit;

transmitting the teaching data including the read calculation value to a machine learning device;

generating, via machine learning by the machine learning device, a learned model using the teaching data including the read calculation value;

executing cruise control in accordance with the signal and the learned model and based on the vehicle state and the environment information of the vehicle;

comparing the sensor value with the calculation value to determine a sensing accuracy of the at least one of the plurality of sensors, the sensing accuracy of the at least one of the plurality of sensors being determined based on a difference between the sensor value and the calculation value, and a comparison with a prescribed value;

determining that an amount or more of the teaching data is accumulated in the storage unit, and performing the machine learning in response to determining that the amount or more of the teaching data are accumulated, wherein the amount is a value stored in advance in the storage unit, the value corresponding to an index that defines a quality of the machine learning;

checking that a flag is one; determining whether the difference between the sensor value and the calculation value is less than the prescribed value in response to determining that the flag is one; and changing the flag to zero in response to determining that the sensing accuracy of the at least one of the plurality of sensors is equal to or more than a prescribed degree; and calculating a drive force from the target acceleration, a vehicle weight, and a vehicle travel resistance that is a function of the vehicle speed; calculating an engine torque based on the drive force, a tire radius, a differential ratio, and a TM gear; and determining an operation amount to be applied to a throttle actuator based on the engine torque and the engine speed of the vehicle using an engine torque characteristics map.

* * * * *